W. L. KORTHAUER.
WEED DESTROYER.
APPLICATION FILED SEPT. 29, 1913.
1,093,786.  Patented Apr. 21, 1914.
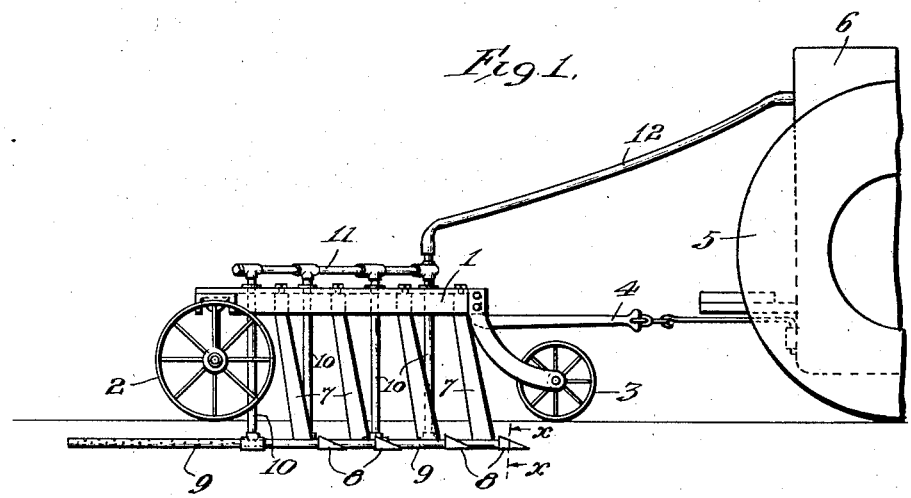
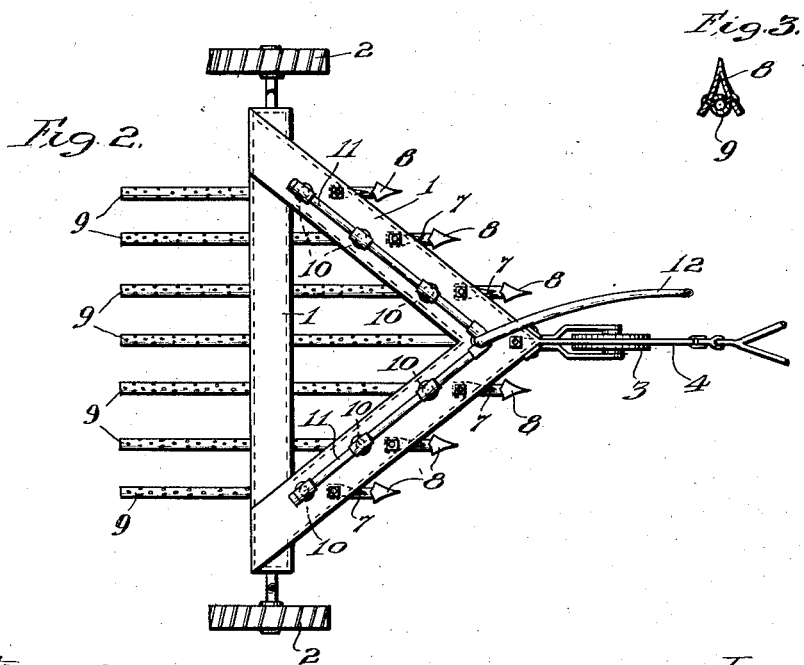

UNITED STATES PATENT OFFICE.

WILLIAM L. KORTHAUER, OF VERDI TOWNSHIP, LINCOLN COUNTY, MINNESOTA.

WEED-DESTROYER.

1,093,786. Specification of Letters Patent. Patented Apr. 21, 1914.

Application filed September 29, 1913. Serial No. 792,305.

*To all whom it may concern:*

Be it known that I, WILLIAM L. KORTHAUER, a citizen of the United States, and a resident of the township of Verdi, county of Lincoln, and State of Minnesota, have invented certain new and useful Improvements in Weed-Destroyers, of which the following is a specification.

My invention relates to improvements in machines for destroying weeds or other undesirable vegetation and has for its object the production of a machine of this character which will be of improved construction and efficient in operation.

Other objects will appear hereinafter.

The invention consists in the combinations and arrangements of parts hereinafter described and claimed.

The invention will be best understood by reference to the accompanying drawing forming a part of this specification, and in which—

Figure 1 is a side elevation of a weed destroying machine embodying my invention, Fig. 2 is a top plan view thereof, and Fig. 3 is an enlarged detail section taken on substantially line $x$—$x$ of Fig. 1.

The preferred form of construction as illustrated in the drawing comprises a substantially triangular supporting frame 1 which is mounted upon rear wheels 2 and front wheel 3, the machine, when in operation, being designed to be drawn over the ground. Provided at the front end of the frame 1 is a tongue or connecting element 4 through the medium of which the machine may be coupled with a traction engine 5 or other suitable traction device equipped with a boiler or source of steam supply 6.

Arranged at the under side of the frame 1 is a plurality of transversely spaced furrowers each of which comprises a depending vertically disposed blade 7 rigidly secured at its upper end to said frame 1. Arranged at the lower end of each blade 7 is a spreading element 8 adapted, when the machine is in operation, to travel just below the surface of the ground or in the vicinity of the roots of the weeds which it is desired to destroy to effect spreading or furrowing of the ground, the blades 7 serving simply to cleave the ground as will be readily understood.

Arranged in alinement with the spreading elements 8 and extending rearward therefrom is a plurality of perforated steam escape or exhaust pipes 9, said pipes, in the operation of the machine, being adapted to travel beneath the ground in the furrows cut by the spreading elements 8 as will be readily understood. The pipes 9 are connected with the lower ends of depending pipes 10 which establish communication between said pipes and a manifold 11 arranged at the upper side of the frame 1, said manifold being connected through a hose 12 with the boiler or source of steam supply 6 of the traction element 5.

In using the machine, the same is drawn over the ground in the manner shown in Fig. 1 so that the blades 7 and spreading element 8 will form furrows in the ground to accommodate the pipes 9. The pipes 9 will be supplied with steam from the supply 6, the steam thus supplied to said pipes escaping therefrom into the ground in the vicinity of their passage to effect destruction of the weeds or vegetation through scalding or scorching. The machine will be found very effective and is readily and easily operated.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A machine of the class described comprising a plurality of spaced furrowers; a plurality of parallel perforated pipes arranged in alinement with and rearward of said furrowers; and means for supplying steam to said pipes, substantially as described.

2. A machine of the class described comprising a plurality of spaced furrowers; a plurality of horizontally disposed parallel perforated pipes arranged in alinement with and rearward of said furrowers and adapted to travel in the furrows cut by said furrowers in the operation of the machine; and means for supplying steam to said pipes, substantially as described.

3. A machine of the class described comprising a plurality of spaced furrowers, each of which consists of a vertically disposed blade adapted to cleave the ground and a spreading element at the lower end of said blade; a plurality of horizontally disposed parallel perforated pipes arranged in alinement with and rearward of said spreading element; and means for supplying steam to said pipes, substantially as described.

4. A machine of the class described comprising a wheeled frame; a plurality of transversely spaced furrowers provided at the under side of said frame, each of said furrowers comprising a depending vertically disposed blade adapted to cleave the ground and a spreading element at the lower end of said blade; a plurality of horizontally disposed parallel perforated pipes arranged in alinement with and rearward of said spreading element; and means for supplying steam to said pipes, substantially as described.

5. A machine of the class described comprising a wheeled frame; a plurality of transversely spaced furrowers provided at the under side of said frame, each of said furrowers comprising a depending vertically disposed blade adapted to cleave the ground and a spreading element at the lower end of said blade; a plurality of horizontally disposed parallel pipes arranged in alinement with and extending rearwardly from said spreading element; a manifold communicating with all of said pipes; and a source of steam supply communicating with said manifold, substantially as described.

6. A machine of the class described comprising a wheeled frame; a plurality of spaced furrowers carried by said frame; a plurality of elongated parallel perforated pipes supported by said frame arranged in alinement with and rearwardly of said furrowers so as to be adapted to travel in the furrows cut by said furrowers in the operation of the machine; and means for supplying a fluid weed destroyer to said pipes, substantially as described.

In testimony whereof I have signed my name to this specification in the presence of two subscribing witnesses.

WILLIAM L. KORTHAUER.

Witnesses:
C. M. SCHOOLEY,
C. O. PETERSON.